Dec. 28, 1926.
J. G. MACLAREN
1,612,137
POWER CONTROLLER FOR PNEUMATIC DISPATCH SYSTEMS
Filed July 29, 1925
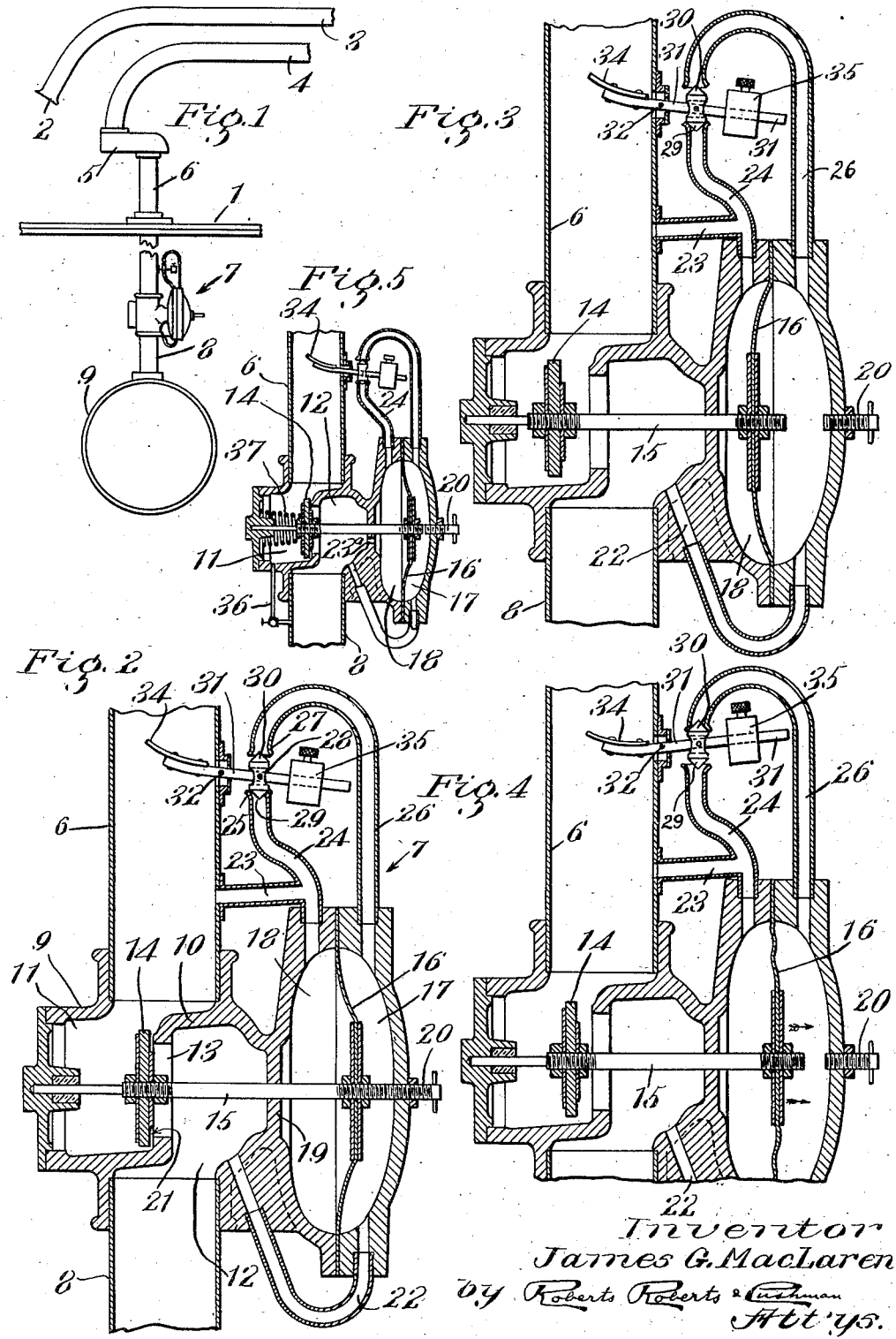
Inventor
James G. MacLaren
by Roberts Roberts & Cushman
Attys.

Patented Dec. 28, 1926.

1,612,137

UNITED STATES PATENT OFFICE.

JAMES G. MACLAREN, OF SYRACUSE, NEW YORK, ASSIGNOR TO THE LAMSON COMPANY, OF SYRACUSE, NEW YORK, A CORPORATION OF MASSACHUSETTS.

POWER CONTROLLER FOR PNEUMATIC-DISPATCH SYSTEMS.

Application filed July 29, 1925. Serial No. 46,929.

This invention pertains to power controllers for pneumatic dispatch systems and relates more particularly to automatically actuated controllers of the so-called minimum flow type of which the patent to Libby 968,576, August 30, 1910 furnishes an early example.

Pneumatic dispatch tube apparatus of the minimum flow type as exemplified by said Libby patent, are vacuum systems as distinguished from pressure systems, and are open or continuous current systems as distinguished from closed systems in which normally no air current is maintained through the line when the line is idle. Controllers for said open or continuous current vacuum systems of the minimum flow type, comprise, essentially a valve for controlling the flow of carrier impelling air current through the transit tube toward the exhauster or vacuum drum, such valve normally cutting down the air current to a minimum when the line is idle, never wholly cutting it off but at all times permitting a continuous flow of relatively small volume called the "minimum" flow, and a pneumatic such as a piston or diaphragm which responds to a change of pressure in the line due to the momentary cutting off or checking of the minimum flow of air by the insertion of a carrier into the tube, and in so responding opens the air valve wide to permit a full flow of air for driving the carrier. For convenience and succinctness of description the term "pneumatic" has herein been employed to designate broadly any pressure or vacuum actuated instrumentality, for example a flexible diaphragm, a piston or a bellows, by means of which fluid pressure is converted into mechanical motion.

In the form of apparatus described in said Libby patent an auxiliary diaphragm and valve are used to control the operation of the main diaphragm which opens the air-valve upon the insertion of a carrier into the tube; also a third valve is used to control the pressures for actuating the auxiliary diaphragm both for its opening and closing function; also a timing device is used for restoring the air-valve to its normal minimum flow position after the discharge of the carrier.

The apparatus of the present invention greatly simplifies the structure of the Libby apparatus in that it dispenses with the auxiliary diaphragm, and valve, also the said third valve, and also the timing device for closing the main valve, and leaves the main diaphragm normally open to the atmosphere at one side and in condition to respond quickly to the pressure variation caused by cutting off the minimum flow, and replaces the timing device with a member instantly responsive to the rush of air which follows the discharge of the carrier, or which is sometimes produced by drop of a carrier through a long vertical run of the tube, for reversing pressure conditions on opposite sides of the main pneumatic positively to return the valve to its normal, closed down position.

I thus open and close the air pressure valve solely by means of differential air pressures and in a preferred arrangement I am able to dispense with the usual valve springs or their equivalents and am thus enabled to provide a control device which is more than ordinarily sensitive to varying pressure conditions and which acts with great rapidity both in opening and closing.

In the accompanying drawings in which certain embodiments of the invention are illustrated by way of example:

Fig. 1 is a fragmentary view showing a portion of the central station apparatus of a pneumatic dispatch system and illustrating one pair of transmission tubes, of which one is the sending tube and the other the receiving or return tube, together with the power control apparatus for said pair of tubes;

Fig. 2 is a vertical section to large scale showing the improved power control apparatus, the main valve being in normal or closed position;

Fig. 3 is a view similar to Fig. 2 but showing the controlling valve wide open in the position which it occupies during transit of a carrier;

Fig. 4 is another view similar to Fig. 2 but showing the main valve while returning from open to normal position immediately after the discharge of the carrier from the transmission line; and Fig. 5 is a view similar to Fig. 1 but to smaller scale and illustrating a slight modification.

Referring to Fig. 1 the numeral 1 designates a portion of a central station desk provided with the dispatch terminal 2 forming part of the sending transmission tube 3 which leads to an outlying station. The corresponding return transmission tube 4 is provided with the usual delivery terminal 5 and with the extension 6 which passes down through the top of the desk 1 and is connected with the power control apparatus 7. A suction tube 8 leads from the power control apparatus to the usual suction drum or header 9 in which a vacuum or sub-atmospheric pressure is constantly maintained by means of a suitable exhauster, not shown. A continuous air passage or conduit is thus provided extending from the terminal 2 to the exhauster, that portion of the conduit comprises by the tubes 3 and 4 with the extension 6 of the latter being hereinafter referred to as the transmission line.

Referring to Figs. 2, 3 and 4, the numeral 9 designates a suitable casing divided by a septum 10 into chambers 11 and 12 which communicate respectively with the tubes 6 and 8. The septum 10 is provided with a valve orifice 13 which is controlled by the main air controlling valve 14. This valve is mounted upon a reciprocal stem 15 by means of which the valve 14 is moved to and from an annular seat which surrounds the orifice 13. This stem is suitably attached to the central part of a flexible diaphragm 16 hereinafter referred to as the "pneumatic" and which constitutes a division wall between chambers 17 and 18 within the casing. The chamber 18 is separated from the chamber 12 by a fixed partition 19 having a suitable guide opening for the stem 15.

An adjustable stop screw 20 has threaded engagement with an opening in the wall of the casing and is adapted to engage the end of the stem 15. By adjusting this screw the valve 14 may normally be held slightly away from its seat when closed so as to provide a narrow annular orifice 21 between the valve and its seat to permit minimum flow of air from the transmission tube to the exhaust tube, such minimum flow being constantly maintained when the main valve is closed. This minimum flow may be provided for in other ways, as for example by the provision of a suitable opening through the septum 10 or by means of a tube or pipe exterior to the casing and connecting the chambers 11 and 12 or the pipes 6 and 8.

The particular means selected for providing this minimum flow is immaterial so far as the present invention is concerned.

The chamber 17 at the right-hand side of the diaphragm as viewed in Figs. 2, 3 and 4 is connected by a suitable passage or conduit 22 to the chamber 12 or to the pipe 8 as may be desired. This conduit or passage may be formed within the thickness of the casing or as here shown may be provided in part at least by means of a pipe exterior to the casing.

The chamber 18 in the preferred construction is connected by a conduit 23 to the tube 6, or to the chamber 11, by an exterior pipe as here shown, or by means of a passage in the thickness of the casing wall. The chamber 17 thus always communicates freely with the exhauster, while the chamber 18 communicates at all times with the transmission line.

A conduit or passage 24 extends from the chamber 18 and terminates in a valve seat 25, while a conduit 26 leads from the chamber 17 and terminates in a valve seat 27. The end portions of the conduits 24 and 26 are axially aligned with each other so that the valve seats 25 and 27 are opposed but in spaced relation.

A valve-carrying member 28 is interposed between the valve seats 25 and 27 and is provided at its opposite ends with conical valve elements 29 and 30 adapted respectively to cooperate with the valve seats 25 and 27 alternatively to close the conduits 24 and 26.

The member 28 is attached to a lever 31 fulcrumed at 32 and carrying a vane or baffle member 34 which is disposed within the tube 6 where it is exposed to the air current flowing through the transmission line. Preferably the outer arm of the lever 31 is furnished with an adjustable weight 35 which is so adjusted that the valve element 29 normally engages the seat 25, while the valve element 30 is normally unseated leaving the conduit 26 freely open to the atmosphere.

In the arrangement shown in Fig. 5 the parts are in general similar to those previously described except for the following features. In this arrangement I have shown an exterior pipe 36 connecting the chamber 11 with the suction tube 8 in order to provide the desired minimum flow. While the adjusting screw 20 is also shown, this may be omitted if desired when the pipe 36 is used.

I also omit the conduit 23 leading from the chamber 18 to the tube 6 and substitute therefor a passage 23ª leading directly from the chamber 18 to the chamber 12. As a further modification I provide a spring 37 disposed within the chamber 11 and which tends to hold the valve 14 in its normal or closed position.

The operation of the device disclosed in Figs. 2, 3 and 4 is substantially as follows, it being assumed that the exhauster is in operation, maintaining a sub-atmospheric pressure in the suction tube 8, and that the stop screw 20 is properly set to provide the desired minimum flow passage 21. When the parts occupy the position of Fig. 2, the difference in pressure at opposite sides of the main valve 14 is sufficient to keep the valve closed until it is positively opened by the action of the diaphragm 16 as hereinafter described.

When a carrier is introduced into the transmission line, either at the central station or at the corresponding outlying station, the minimum flow through the tube 6 is cut off and the pressure in the tube 6 is thus reduced. This reduced pressure is transmitted through the conduit 23 to the chamber 18, and since the chamber 17 at the opposite side of the diaphragm 16 is normally under atmospheric pressure, the diaphragm 16 immediately moves to the left as viewed in Fig. 2 until it occupies the position shown in Fig. 3. Since this movement of the valve 14 is not opposed by a spring or similar device, the valve moves very freely and responds very quickly to the reduction in pressure due to cutting off the minimum flow. The parts now occupy the position shown in Fig. 3 with the main valve wide open thus permitting a free carrier impelling flow of air to take place through the transmission tube. This full flow of air drives the carrier towards its destination.

When the carrier arrives at its destination and emerges from the tube the frictional resistance which it offers to the air flow is thereby suddenly released and a momentary increase in velocity through the transmission line takes place. The weight 35 is so adjusted upon the lever 31 that under minimum flow conditions and during transmission of the carrier the baffle or vane 34 occupies the position shown in Figs. 2 and 3, but when this sudden momentary rush of air occurs upon the discharge of the carrier, the vane 34 responds thereto and tilts the lever 31 to the position shown in Fig. 4. This movement of the lever shifts the valve member 28 from the position of Fig. 3 to that of Fig. 4 where the valve element 29 is unseated leaving the conduit 24 open to the atmosphere and the valve 30 is seated thus closing the conduit 26.

Since the chamber 17 is now closed to the atmosphere, although communicating with the suction tube, while the chamber 18 is open to the atmosphere, the pressure conditions which normally exist upon opposite sides of the diaphragm are reversed and the diaphragm rapidly moves to the right until it is restored to the position shown in Fig. 2, thus closing the main air controlling valve and cutting off the air impelling flow through the transmission tube. Immediately upon closure of the main valve and the cutting off of full flow through the transmission line the weight 35 restores the lever 41 to normal position, thus closing conduit 24 and opening conduit 26 so that the parts are then ready for a repetition of the above operation.

While the response of the vane or baffle 34 has been described as occurring when a carrier emerges from the tube it may at times respond to pressure conditions resulting from the drop of a carrier through a long vertical run of the tube and this is desirable as under such conditions it is preferable to cut off the main air flow momentarily to avoid undue acceleration of the carrier. As soon, however, as the carrier slows down beyond its normal transmission speed the diaphragm 16 will again move to the left and open the main valve in the same way as when a carrier is first placed in the tube.

In the arrangement shown in Fig. 5 the operation in general is the same as that described, but since in this arrangement the chamber 18 is always in communication with the space at the suction side of the main valve, the difference in pressure at opposite sides of the closed main valve might not be sufficient to keep it closed although by proper relative adjustment of the sizes of the passages leading from the chambers 17 and 18, reasonably certain results can be obtained. However, to avoid any improper operation, the spring 37 is provided, such spring being of just sufficient tension to hold the valve to its seat under normal conditions. When the minimum flow is cut off by introduction of a carrier the normally existing difference in pressure at opposite sides of the main valve is reduced and the spring yields to permit the diaphragm to open the valve.

While preferred embodiments of the invention have herein been illustrated I contemplate the embodiment of the principle of the invention in other specific constructions and wish it to be understood that the invention is not in any way restricted to the exact arrangement herein disclosed or to the relative proportions of parts illustrated, and that equivalent elements may be substituted for those herein shown and described.

I claim:

1. Power control apparatus for a pneumatic dispatch system of the vacuum minimum flow type having a transmission tube and an exhauster, said apparatus comprising a valve adapted directly to control carrier impelling air flow in the transmission tube, a minimum flow of air through the transmission tube being at all times permitted, and a pneumatic connected to the valve for actuating the latter, the opposite sides of said pneumatic being alternately exposed, respectively to atmospheric pressure and to a sub-atmospheric pressure.

2. Power control apparatus for a pneumatic dispatch system of the vacuum minimum flow type having a transmission tube and an exhauster, said apparatus comprising a valve adapted directly to control carrier impelling air flow in the transmission tube, a minimum flow of air through the transmission tube being at all times permitted, and a pneumatic for actuating the valve, one side of the pneumatic normally being exposed to atmospheric pressure and the other to sub-atmospheric pressure, and means for substantially reversing pressure conditions at the opposite sides of the pneumatic.

3. Power control apparatus for a pneumatic dispatch system of the vacuum minimum flow type having a transmission tube and an exhauster, said apparatus comprising a main valve adapted directly to control carrier impelling air flow in the transmission tube, a minimum flow of air through the transmission tube being at all times permitted, and a pneumatic for actuating the valve, normally open auxiliary valve means admitting atmospheric pressure to act upon one side of the pneumatic, and normally closed auxiliary valve means cutting off atmospheric pressure from the other side of the pneumatic, and means for concomitantly closing the first valve means and opening the second valve means.

4. Power control apparatus for a pneumatic dispatch system of the vacuum minimum flow type having a transmission tube and an exhauster, said apparatus comprising a valve adapted directly to control carrier impelling air flow in the transmission tube, a minimum flow of air through the transmission tube being at all times permitted, and a pneumatic for actuating the valve, conduits leading from opposite sides of the pneumatic, one of said conduits normally being open to the atmosphere and the other normally being closed, and means responsive to flow of air through the transmission tube, at and above a predetermined rate, for closing the first of said conduits and for opening the other.

5. Power control apparatus for a pneumatic dispatch system of the vacuum minimum flow type having a transmission tube and an exhauster, said apparatus comprising a valve for controlling carrier impelling air flow in the transmission tube, a minimum flow of air through the transmission tube being at all times permitted, and a pneumatic for actuating the valve, conduits leading from opposite sides of the pneumatic, valve means normally closing one of said conduits and leaving the other open, and a movable baffle device responsive to variations in velocity of air flow through the transmission tube incident to discharge of a carrier therefrom for moving said valve means to open the first named of said conduits and to close the second.

6. Power control apparatus for a pneumatic dispatch system of the vacuum minimum flow type having a transmission tube and an exhauster, said apparatus comprising a main valve adapted directly to control carrier impelling air flow in the transmission tube, a minimum flow of air through the transmission tube being at all times permitted, a pneumatic connected to the main valve for actuating the latter, a movable member provided with auxiliary valve elements adapted respectively to close passages leading from the atmosphere to opposite sides of the pneumatic, one of said valve elements normally closing its passage, the other valve element being normally positioned to leave its passage open, and means for moving said member whereby to open the first passage and to close the second passage.

7. Power control apparatus for a pneumatic dispatch system of the vacuum minimum flow type having a transmission tube and an exhauster, said apparatus comprising a main valve for controlling carrier impelling air flow in the transmission tube, a minimum flow of air through the transmission tube being at all times permitted, and a pneumatic for actuating the valve, conduits leading from opposite sides of the pneumatic, the outer ends of said conduits being opposed and in spaced aligned relation, a movable member carrying valve elements at its opposite ends adapted alternatively to close the ends of the respective conduits, said member normally being positioned to close one conduit and to leave the other open, and means for moving said member to open the first conduit and to close the second conduit.

8. Power control apparatus for a pneumatic dispatch system of the vacuum minimum flow type having a transmission tube and an exhauster, said apparatus comprising a valve for controlling carrier impelling air flow in the transmission tube, a minimum flow of air through the transmission tube being at all times permitted, conduits leading from opposite sides of the pneumatic, the outer ends of said conduits being opposed and in spaced aligned relation, a movable member carrying valve elements at its opposite ends adapted alternatively to close the ends of the respective conduits, said member normally being positioned to close one conduit and to leave the other open, a lever supporting said movable valve carrying member, and a vane connected to the lever, said vane being disposed in the carrier impelling air current and responding to fluctuation in velocity of said current to tilt the lever and shift the valve carrying member to open the first conduit and to close the second.

9. Power control apparatus for a pneumatic dispatch system of the vacuum minimum flow type having a transmission tube and an exhauster, said apparatus comprising a valve for controlling carrier impelling air flow in the transmission tube, a casing having a pneumatic therein separating two chambers within the casing, means connecting the pneumatic to the valve, each chamber communicating with a space in which the air pressure is normally sub-atmospheric, and means operative to admit atmospheric pressure alternatively to the respective chambers.

10. Power control apparatus for a pneumatic dispatch system of the vacuum minimum flow type having a transmission tube and an exhauster, said apparatus comprising a valve for controlling carrier impelling air flow in the transmission tube, a casing having a pneumatic therein separating two chambers within the casing, means connecting the pneumatic to the valve, each chamber communicating with the space in which the air pressure is normally sub-atmospheric, conduits leading from each chamber to admit atmospheric air thereto, valve means normally closing one of said conduits, the other being open, and means for actuating said valve means to open the first conduit and to close the second.

11. Power control apparatus for a pneumatic dispatch system of the vacuum minimum flow type having a transmission tube and an exhauster, said apparatus comprising a valve for controlling carrier impelling air flow in the transmission tube, a casing having a pneumatic therein separating two chambers within the casing, means connecting the pneumatic to the valve, each chamber communicating with a space in which the air pressure is normally sub-atmospheric, conduits leading from the respective chambers, a valve device normally closing one conduit and leaving the other open to the atmosphere, and means responsive to discharge of a carrier from the transmission tube to shift said valve device to open the first conduit and to close the second conduit.

12. Power control apparatus for a pneumatic dispatch system of the vacuum minimum flow type having a transmission tube and an exhauster, said apparatus comprising a valve for controlling carrier impelling air flow in the transmission tube, a casing having a pneumatic therein separating two chambers within the casing, means connecting the pneumatic to the valve, said chambers communicating with the spaces at opposite sides respectively of the controlling valve, conduits leading from the respective chambers, one of said conduits normally being closed and the other open to the atmosphere, and a device responsive to discharge of a carrier from the transmission tube and by such response opening the first conduit to the atmosphere and closing the other.

13. Power control apparatus for a pneumatic dispatch system of the vacuum minimum flow type having a transmission tube and an exhauster, said apparatus comprising a valve for controlling carrier impelling air flow in the transmission tube, a casing having a pneumatic therein separating two chambers within the casing, means connecting the pneumatic to the valve, one of said chambers normally being subject to minimum flow pressure and the other communicating freely with the exhauster, a normally closed conduit leading from the first chamber, a conduit leading from the second chamber and normally open at its outer end to atmospheric pressure, and means for opening the first conduit to atmospheric pressure and for closing the second conduit.

14. Power control apparatus for a pneumatic dispatch system of the vacuum minimum flow type having a transmission tube and an exhauster, said apparatus comprising a valve for controlling carrier impelling air flow in the transmission tube, a casing having a pneumatic therein separating two chambers within the casing, means connecting the pneumatic to the valve, one of said chambers normally being subject to minimum flow pressure and the other communicating freely with the exhauster, and means adapted alternatively to admit air at atmospheric pressure to either chamber and concomitantly to cut off the other chamber from the atmosphere.

15. Power control apparatus for a pneumatic dispatch system of the vacuum minimum flow type having a transmission tube and an exhauster, said apparatus comprising a valve for controlling carrier impelling air flow in the transmission tube, a casing having a pneumatic therein separting two chambers within the casing, means connecting the pneumatic to the valve, one of said chambers normally being subject to minimum flow pressure and the other communicating freely with the exhauster, a movable baffle member responsive to variation in rate of air flow in the transmission tube, and means actuable by said baffle alternatively to admit air at atmospheric pressure to either chamber and concomitantly to cut off the other chamber from the atmosphere.

16. Power control apparatus for a pneumatic dispatch system of the vacuum minimum flow type having a transmission tube and an exhauster, a minimum flow of air through the transmission tube being permitted at all times, said apparatus comprising a main valve directly controlling carrier impelling air flow in the transmission tube, and pneumatic means for positively moving the valve in opposite directions.

17. Power control apparatus for a pneumatic dispatch system of the vacuum minimum flow type having a transmission tube and an exhauster, a minimum flow of air through the transmission tube being permitted at all times, said apparatus comprising a main valve directly controlling carrier impelling air flow in the transmisson tube, and a pneumatic constituting the sole means for opening and closing the valve.

18. Power control apparatus for a pneumatic dispatch system of the vacuum minimum flow type having a transmission tube and an exhauster, a minimum flow of air through the transmission tube being permitted at all times, said apparatus comprising a main valve directly controlling carrier impelling air flow in the transmission tube, a pneumatic directly connected to the valve, and means for establishing a predominant pressure alternately at opposite sides of the penumatic whereby the pneumatic is adapted positively to move the valve in either direction.

19. Power control apparatus for a pneumatic dispatch system of the vacuum minimum flow type having a transmission tube and an exhauster, a minimum flow of air through the transmission tube being permitted at all times, said apparatus comprising a main valve directly controlling carrier impelling air flow in the transmission tube, a pneumatic connected to the valve, and means for alternatively admitting air pressure to act upon either side of the pneumatic, said pressure being higher than the concurrent pressure acting on the other side of the pneumatic, whereby positively to move the pneumatic in either direction to open or close the valve, respectively.

20. Power control apparatus for a pneumatic dispatch system of the vacuum minimum flow type having a transmission tube and a suction tube, said apparatus comprising a valve controlling a passage leading from the transmission tube to the suction tube, a minimum flow of air from one tube to the other being permitted at all times, a pneumatic for actuating the valve, said pneumatic separating two chambers within the casing, the first chamber communicating at all times with the transmission tube and the second chamber communicating with the suction tube, conduits leading from said chambers to the atmosphere, the conduit from the first chamber normally being closed and the conduit from the second chamber normally being open, and means for closing the latter conduit and concomitantly opening the first conduit.

21. Power control apparatus for a pneumatic dispatch system of the vacuum minimum flow type having a transmission tube and a suction tube, said apparatus comprising a valve which controls a passage leading from the transmission tube to the suction tube, a minimum flow of air from one tube to the other being permitted at all times, a pneumatic for actuating the valve, said pneumatic separating two chambers within the casing, the first chamber communicating at all times with the transmission tube and the second chamber communicating with the suction tube, conduits leading from said chambers to the atmosphere, an auxiliary valve device common to the two conduits, said auxiliary valve device being adapted alternatively to close one conduit while leaving the other open and normally closing the conduit leading from the first chamber, and means responsive to discharge of a carrier from the transmission tube for shifting the auxiliary valve device to open the first conduit and to close the second.

22. Power control apparatus for a pneumatic dispatch system of the vacuum minimum flow type having a transmission tube and a suction tube, said apparatus comprising a valve controlling a passage leading from the transmission tube to the suction tube, a minimum flow of air from one tube to the other being permitted at all times, a pneumatic for actuating the valve, said pneumatic separating two chambers within the casing, the first chamber communicating at all times with the transmission tube and the second communicating with the suction tube, conduits leading from said chambers to the atmosphere, an auxiliary valve device common to the two conduits, said auxiliary valve device being adapted alternatively to close one conduit while leaving the other open, and normally closing the conduit leading from the first chamber, and a movable vane sensitively responsive to variation in velocity of air flowing through the transmission tube for shifting the auxiliary valve device to open the first conduit and to close the second when a carrier discharges from the transmission tube.

23. Power control apparatus for a pneumatic dispatch system of the vacuum minimum flow type having a transmission tube and an exhauster, said apparatus comprising a valve for controlling carrier impelling air flow in the transmission tube, a casing having a pneumatic therein, separating two chambers within the casing, means connecting the pneumatic to the valve, one of said chambers normally communicating freely with the outer air and the other with a space in which the pressure is normally subatmospheric, a vane responsive to the rush of air through the tube incident to discharge of a carrier therefrom, and means actuated by the vane for cutting off the first chamber from the outer air when the carrier discharges from the tube and for simultaneously admitting atmospheric air to the other of said chambers.

24. Power control apparatus for a pneumatic dispatch system of the vacuum minimum flow type having a transmission tube and an exhauster, said apparatus comprising a valve adapted directly to control carrier impelling air flow in the transmission tube, a minimum flow of air through the transmission tube being at all times permitted, a pneumatic connected to the valve for actuating the latter, the opposite sides of said pneumatic being alternately exposed respectively to atmospheric pressure and to a subatmospheric pressure and yieldable means tending to prevent movement of the valve away from its seat when the transmission tube is idle.

Signed by me at Syracuse, N. Y., this 20th day of July, 1925.

JAMES G. MACLAREN.